Oct. 21, 1924.
F. L. O. WADSWORTH
1,512,512
SPRING SUSPENSION SYSTEM
Filed April 11, 1922  2 Sheets-Sheet 1
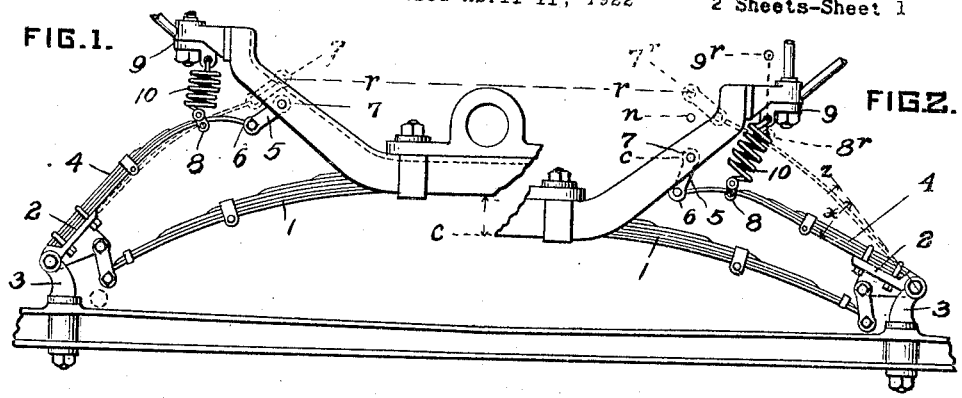
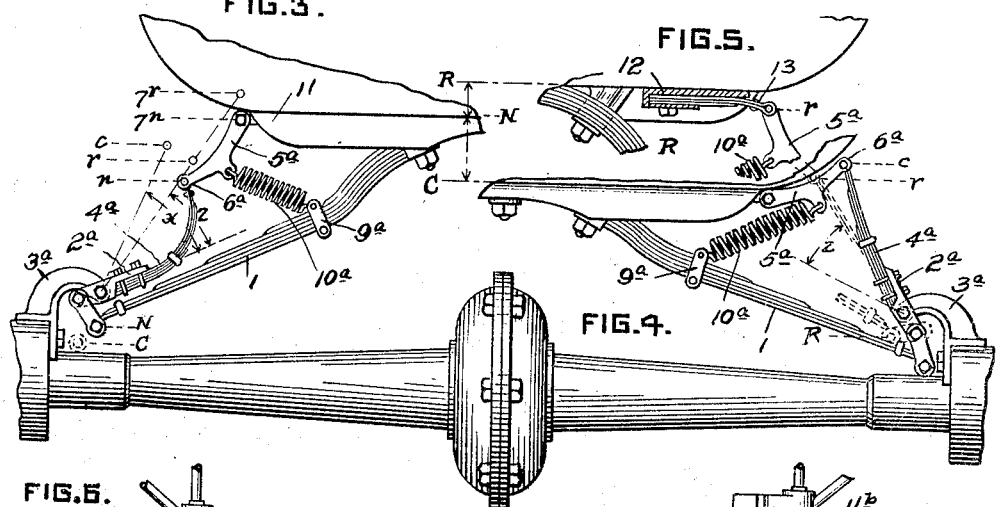
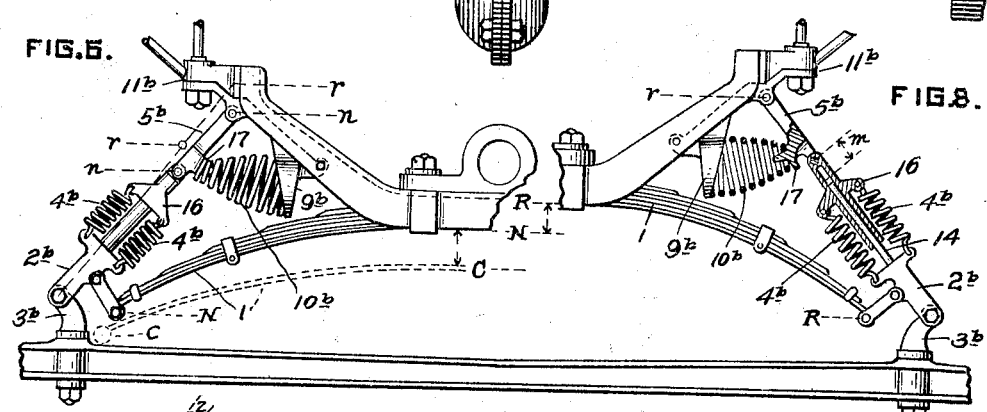
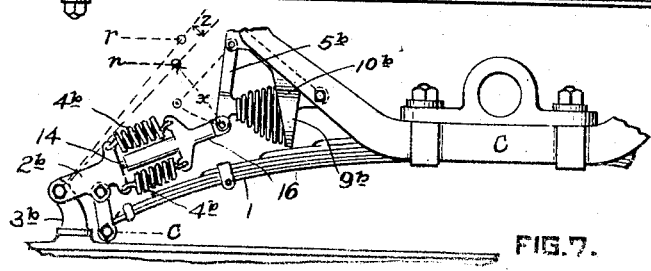
INVENTOR
F. L. O. Wadsworth Oct. 21, 1924.  1,512,512
F. L. O. WADSWORTH
SPRING SUSPENSION SYSTEM
Filed April 11, 1922    2 Sheets-Sheet 2
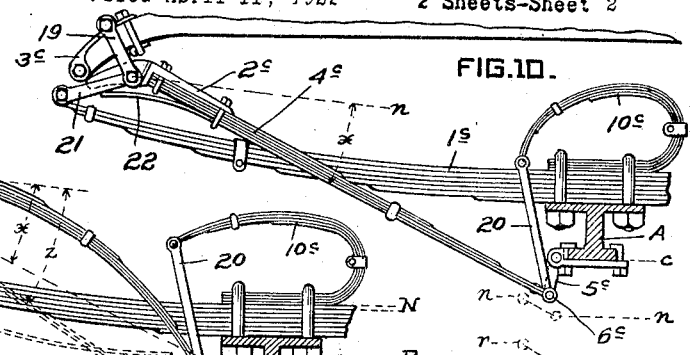
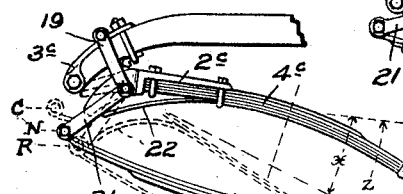
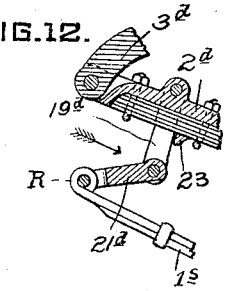
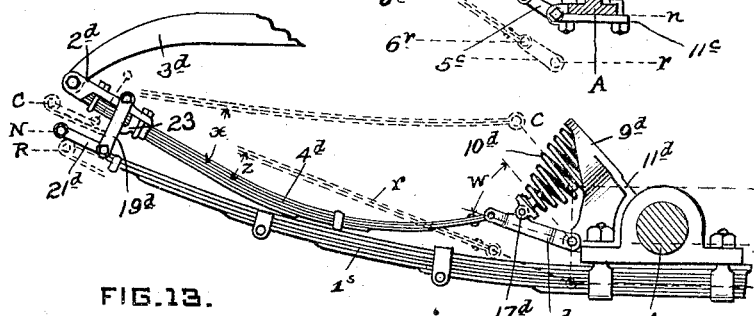
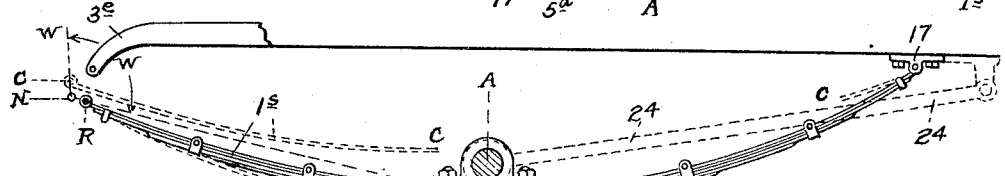
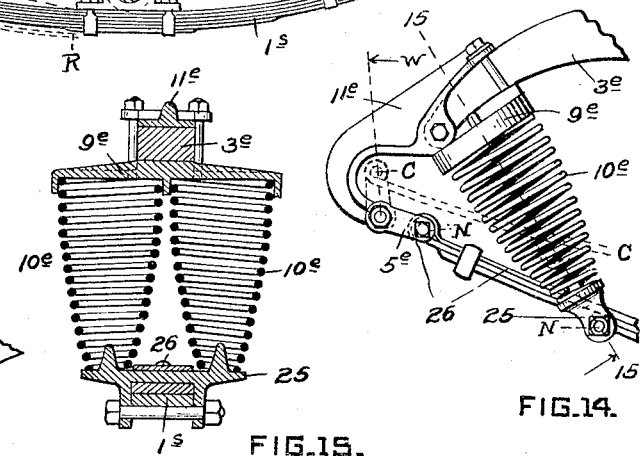
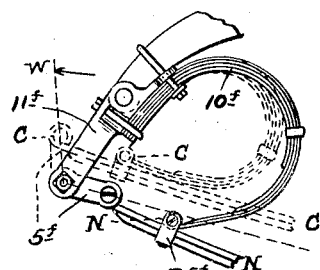
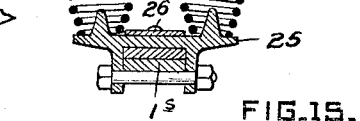
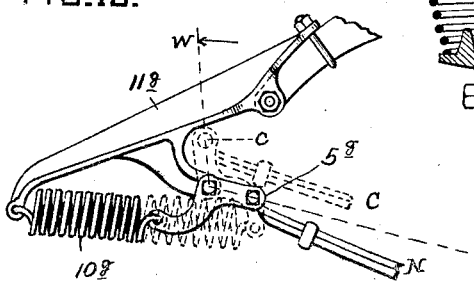
INVENTOR
F. L. O. Wadsworth Patented Oct. 21, 1924.

1,512,512

UNITED STATES PATENT OFFICE.

FRANK L. O. WADSWORTH, OF PITTSBURGH, PENNSYLVANIA.

SPRING SUSPENSION SYSTEM.

Application filed April 11, 1922. Serial No. 551,675.

*To all whom it may concern:*

Be it known that I, FRANK L. O. WADSWORTH, a citizen of the United States, residing at Pittsburgh, Pennsylvania, have invented a new and useful Improvement in Spring Suspension Systems, of which the following is a full, clear, and exact description, such as will enable others skilled in the art to which it appertains to make and use the same.

My invention relates to supplemental spring suspension systems of the general species disclosed in my copending application Ser. No. 551,674, in which the relative movement of the spring supported parts in one direction is utilized to impose a lateral or transverse stress on the secondary suspension members, and the opposed relative movement, in the reverse direction, is employed to impose a longitudinal or endwise strain on the supplemental spring elements. The principal features and advantages of this species of elastic suspension construction are: The effective combination of primary and secondary springs which will cooperate to supplement and complement each other in cushioning and absorbing both minor and major vibrations and shocks; the arrangement of the main and supplemental spring members in such operative relationship as to produce an increased elastic strain in the secondary suspension elements whenever the main spring is moved in either direction from normal load position—thereby resisting and restraining both the increased flexure of the primary resilient element and the rebound or recoil of that element beyond its position of static equilibrium—and the disposition of the cooperating members in such manner as to prevent, or rapidly check, any transverse sway or horizontal displacement of the vertically movable parts that are supported by the system.

A further specific object of this invention is the provision of means whereby all of the above mentioned advantages may be secured without the use of any positive mechanical stops, or limits, to the movement of the oscillating suspension elements, and without any sudden or abrupt checking or reversal of the elastically restrained movement, thereby securing a very smooth and easy action of the suspension system as a whole.

Other detail features and advantages of the present improvements will be made apparent, to those skilled in this art, by the accompanying illustrations and descriptions of various exemplary construction, which embody my invention in whole or in part.

In the drawings, which form a part of the specification; Fig. 1 is a front elevation of one side of a cross-leaf spring support, which is provided with my improved form of secondary spring control, and shows the parts of the system in their normal load position of static equilibrium; Fig. 2 is a similar view of the other side of this system and shows the members thereof in the position which they assume under an increased kinetic load or compression shock; Figs. 3, 4 and 5 are rear elevations of one of my improved suspension systems for the rear axle of a Ford car, and respectively show the essential parts of the combination in their positions, of normal load, of subnormal compression, and of abnormal rebound or expansion; Figs. 6, 7 and 8 are front views of another exemplification of my invention as it may be utilized in conjunction with a cross-leaf spring, and depict the parts in the same respective positions as are illustrated in Figs. 3, 4 and 5; Fig. 9 is an elevation of the rear end portion of a side-leaf spring suspension which embodies the present improvements; Fig. 10 is a similar view of this same construction showing the parts in a position of extreme compression; Fig. 11 is a further illustration of the manner in which my invention can be incorporated in a side-leaf spring suspension system; Fig. 12 is a detail sectional view of certain parts of the construction shown in Fig. 11 (in the position assumed by them on extreme rebound); Fig. 13 is a diagrammatic view of an ordinary side-leaf spring support with the ordinary shackle link coupling, between it and the body member, removed; Fig. 14 is an enlarged detail view of a spring controlled link connection which may be substituted for the ordinary rigid shackle coupling at one end of the main spring, and which forms, in conjunction with the said spring, a modified exemplification of the invention; Fig. 15 is a cross section on the plane 15—15 of Fig. 14; and Figs. 16 and 17 are illustrations of other supplemental spring-controlled-link suspensions that may be used in the same manner as the construction shown in Figs. 14 and 15.

In the form of organization depicted in Figs. 1 and 2, the main cross-leaf spring 1, is shackled, at its end, to the intermediate parts of lever elements, 2, 2; and the latter are pivotally mounted, at their outer extremities, on the axle perches 3, 3. The levers 2, 2, are bolted rigidly to the thick ends of the relatively flexible multiple-leaf springs, 4, 4, which are obliquely disposed at symmetrically inclined positions on opposite sides of the vehicle body; and which normally present a pronounced positive convexity, or "camber," in the direction of their axes. The inner and longer plates of these bowed secondary elements are preferably made somewhat thicker or less flexible than the superimposed leaves of elastic material, and are provided at their inner ends with integrally formed or welded eyes 6, 6, which are pivotally connected to the ends of the links 5, 5; and the latter are, in turn, pivoted to the body of the vehicle at 7, 7. An adjustable clip 8 is attached to each of the springs 4, at a point near the eye end thereof, and this clip is elastically coupled to a body bracket, or clip 9, by an auxiliary coil spring 10.

The functional performance of this system is as follows: The clips 8, or the lengths and initial tensions of the auxiliary spring 10, are so adjusted that the link connections 5—to which the inner ends of the supplemental springs 4 are attached—are normally held in substantial axial alignment with the pivot supports of the supplemental spring-lever members 2—4 (see Fig. 1); and in this position of static equilibrium, the load stresses on the ends of the main spring are carried, in part on the axle brackets 3—3, and in part by the concurrent and cooperative flexures in the series connected springs 4—10. When the system is subjected to an increased kinetic load or compression stress the body and axle members are forced toward each other; the lever and spring elements, 2—4, are rocked downwardly on their axle supports 3—3; and an increased flexural strain is cooperatively imposed on both the secondary resilient elements 4—10 of the suspension system. The concurrent swinging and flexural movements of the bowed leaf springs, 4—4, rocks the links, 5—5, inwardly (toward the full line positions shown in Fig. 2) and brings them into position to receive and support a portion of the increased load stress that is carried by the secondary resilient elements; thus correspondingly relieving a portion of the concurrently increased strain on the auxiliary coil springs 10. When the body and axle members rebound or separate beyond the normal load position of Fig. 1—(and move toward the dotted positions $r$—$r$ of the illustrations)—the lever and link members 2 and 5—which are attached to the opposite ends of the leaf springs 4—4 and are in substantial axial alignment therewith—exert a direct longitudinal pull on these curved resilient suspension elements, and stretch them or flatten them out to the form shown by the dotted lines of Figs. 1 and 2; and the relatively opposed movements of the clip elements, 8, and of the bracket elements 9— which result from the last described action— simultaneously impose an added stretch or tension on the auxiliary coil springs 10—10, the amount of which is indicated by the separation of the points $8^r$—$9^r$ of Fig. 2. All of the secondary suspension springs therefore cooperate with each other, to elastically restrain the rebound or expansion of the system, and to prevent any excessive separation of the body and axle parts, or any abnormal reversed flexure or "camber" of the main spring 1; and this restraint is rapidly and progressively augmented, as the rebound stress or recoil increases, without the intervention or assistance of any mechanical stops, or limits, to the smooth oscillatory movements of the elastically suspended members.

The oppositely directed and symmetrically inclined forces which are exerted on opposite sides of the vehicle body—by the obliquely directed stresses transmitted thereto through the tensioned springs 4, 4, and 10 10—hold the tonneau member "centered" on the running gear or axle members; and effectually check any tendency to lateral sway or transverse displacement of the two vertically oscillating portions of the vehicle chassis. This restraint, or prevention, of body sway, or "side rolling," of the vehicle on the road, is a very necessary and important feature of successful shock absorber constructions; and it will be observed that at the limit, $r$, of rebound movement—where the effect of any side sway is the most unpleasant and the most dangerous—the stretched and nearly rectilinear leaf elements 4, 4 of my construction, act as substantially rigid braces to effectually prevent any relative lateral displacement of the tonneau parts with respect to the axle and wheel supports therefor.

The form of construction shown in Figs. 3, 4 and 5 differs from the one just described only in the relative structural form and arrangement of the various lever-spring-and-link elements of the secondary suspension combination. In this second exemplification of my invention the levers $2^a$, $2^a$, are pivotally supported at intermediate points in their length, on the brake drum brackets $3^a$, $3^a$, of the rear axle; and are shackled at their outer extremities to the ends of the main spring 1. The inner and longer leaves of the bowed supplemental springs $4^a$, $4^a$, are, in this case, formed of very thin flexible strips of steel, which are folded and riveted together at the fold, to form eyes $6^a$, $6^a$, at their inner ends; and these eyes are pivotally coupled to body brackets 11 by means of the curved links 5ª, 5ª. The intermediate portions of the link arms 5ª, are elastically connected with main spring clips 9ª—9ª, by means of closed coil springs 10ª—10ª; and the initial tension of these springs 10ª is so adjusted (e. g., by shifting the adjustable clips 9ª or in any other suitable manner) as to hold the links 5ª—5ª in substantial axial alignment with axle bracket pivots, on which the lever-spring-suspension elements 2ª—4ª are mounted. The body brackets, 11, which carry the upper ends of the link connections 5ª, are, in this case, composed of rigid channel bars 12, and stiff flat springs 13, bolted thereto and serving to afford slightly yielding supports for the said connections (as best shown in section in Fig. 5).

The operation of this organization is substantially identical with that of the first described construction. When the system is subjected to a temporarily increased load stress, or shock, the parts are moved from the normal load positions N—n (shown in full lines in Fig. 3) toward the compressed positions C—c (e. g., Fig. 4); and in this movement the supplemental leaf springs 4ª, 4ª, are swung outwardly and flattened out—carrying with them the link connections 5ª, 5ª—and the auxiliary coil springs 10ª—10ª are simultaneously elongated and subjected to an increased tension strain. When the normally loaded system is subjected to a rebound or expansion stress the parts are moved toward the positions, R—r, partially shown in full lines in Fig. 5 and partially in dotted lines in Figs. 3 and 4; and in this movement the separation of the body and axle members (and of the lever and link elements 2ª—5ª respectively attached thereto) imposes a longitudinal or endwise stress on the bowed leaf springs 4ª—4ª, and stretches them to the same form as they assume under the transversely applied forces to which they are subjected by compressive movements of the system. The possible rebound movement (7ⁿ to 7ʳ, Fig. 3) which is permitted by this stretching and flattening of the springs 4ª is rather small; but the range of expansion action may be increased (e. g., from N to R, Fig. 5) by the yielding of the spring supports 13 for the link connections 5ª; and any excessive separation of the body and axle members will thus be elastically checked and abated without any sudden arrest or stop of the smooth oscillatory movement of the parts. The straightening out of the supplemental leaf springs to the dotted line positions of Figs. 3 and 4 will rock the levers 2ª through the angles $z$ [this angular movement being nearly as great as that $(x)$ which accompanies extreme compression, C—c] and will thus correspondingly depress the outer ends of those elements. But the relief of pressure on the main spring, which accompanies or results from rebound movements, allows the outer ends of this main spring to curl inwardly and downwardly; and this recoil movement, acting in conjunction with the freely swinging shackle connections between the adjacent extremities of the spring 1 and levers 2ª—2ª, permits the body and the center of the primary suspension member to move away from the axle (as shown by the full and dotted lines R—R of Figs. 4 and 5) without imposing any substantial negative flexure or subnormal "camber" thereon.

The symmetrically inclined and outwardly directed pulls of the tensioned suspension elements 5ª—10ª, on the opposite sides of the body member, keeps the latter centered on its running gear supports in all positions of the system; and this centering action becomes more and more powerful as the vertical displacement of the parts from normal load position (N—n) is increased.

In the construction illustrated in Figs. 6, 7 and 8 each of the lever elements of the secondary suspension combination comprises a T-shaped arm 2ᵇ, which is pivotally mounted on an axle perch 3ᵇ; is shackled, at an intermediate point in its length, to the adjacent end of the main spring 1; and is provided at its opposite extremity with a rigid guide extension 14 (see Fig. 8), that is adapted to slidably engage another T-shaped frame 16. The opposed heads of these frames are connected by a pair of short stiff tension springs 4ᵇ, 4ᵇ, which act to normally hold the foot of the upper frame in engagement with the head of the lower frame and thus maintain the springs 4ᵇ under a predetermined initial tension. The inner ends of the upper frames 16 are pivotally connected to the ends of links 5ᵇ, 5ᵇ, that are rockingly mounted on the body brackets, 11ᵇ; and these links are normally held in substantial alignment with the guides 14 and the pivot supports of the lever frames 2ᵇ, by means of the auxiliary compression springs 10ᵇ, that are interposed between heads 17 on the link elements and seats 9ᵇ on the body brackets 11ᵇ.

The action of the various conjoined parts of this construction, under the effect of compression stresses or shocks, is illustrated in Fig. 7. The relative approach of the body and axle members rocks the engaged lever frames 2ᵇ—16—and the link arms 5ᵇ connected thereto—downwardly, and compresses the auxiliary suspension springs 10ᵇ against their seats 9ᵇ on the body support. This elbow joint movement of the elements 2ᵇ and 5ᵇ also draws the frame 16 inwardly on its guide member 14 and slightly increases the initial tension on the supplemental coil springs 4ᵇ, which thus cooperate with the springs 10ᵇ in elastically restraining and cushioning the compression of the system. When the spring supported parts have returned to the static or normal load position shown in Fig. 6, any rebound or expansion of the system beyond that point will move the active members thereof toward the positions, R—r, shown in Fig. 8; and will thereby separate the heads $2^b$ and 16 by an amount (m) that is substantially equal to the rebound movement (N—R or n—r). The small angular change in the axes of the aligned members, $2^b$—16—$5^b$, which accompanies this expansion movement, (see dotted lines of Fig. 6) also imposes a slight additional compression on the auxiliary coil springs $10^b$; and both sets of secondary resilient elements ($4^b$ and $10^b$) therefore cooperate in elastically restraining the relative displacements of the body and axle members in either direction from normal load position. It is also evident that the relative disposition and operative arrangement of the parts is such as to always subject the body of the vehicle to symmetrically applied and oppositely directed forces that will effectively resist any lateral displacement or side rolling of that member on its running gear supports.

The suspension system depicted in Figs. 9 and 10 of the drawings comprises a main side-leaf spring $1^s$, which is pinned at its inner end to a fixed bearing block on the tonneau frame of the vehicle (as shown at 17, Fig. 13); is clamped at its center to the axle A; and is operatively conjoined at its outer end, to a scroll arm or extension of the body sill, through the intervention of my improved secondary suspension combination. This combination consists of; a lever element $2^c$, which is shackled, at an intermediate point in its length, to the scroll arm bracket $3^c$ by means of the swinging links 19; a pair of bowed supplemental leaf springs $4^c$ symmetrically positioned one on each side of the main spring $1^s$ and rigidly secured at their thick ends to the lever $2^c$; a rigid link connection $5^c$, which is pivotally attached, at its opposite extremities, to the eye ends of the springs $4^c$ and to the axle bracket $11^c$; and an auxiliary spring $10^c$ which is connected to the conjoined extremities of the elements $4^c$—$5^c$, by a pair of tie bars 20, and which is so formed and adjusted that its normal initial tension is sufficient to hold the axis of the link $5^c$ in substantial alignment with the pivotal support of the lever $2^c$, when the members of the system are in their positions (N—n) of static equilibrium (Fig. 9). This secondary-lever-spring-link combination is coupled to the outer eye end of the main spring $1^s$ by a "one way" shackle connection, which consists of a pair of bars 21 that are pivoted, at their opposite extremities, to the said main spring eye and to the pintle support of the lever $2^c$, and are engaged, on their upper edges, by the adjacent rabbeted edge of the said lever. The lower leaves of the springs $4^c$ are made, as before, of single strips of material folded near their centers to form the inner eyes $6^c$; and the opposite ends of the longer folds are clamped to the lever $2^c$ at one point only, leaving extended portions 22 free to elastically engage the bars 21 and hold them in normal contact with the lever $2^c$.

Fig. 9 shows the parts of the last described construction in the position (N—n) which they occupy under normal load. When the body and axle members are forced closer to each other, under the action of an increased kinetic load or shock, the various operative elements of the combination are moved toward the position (C—c) shown in full lines in Fig. 10. In this movement the lever-spring elements $2^c$, $4^c$, are rocked in a clockwise direction through the angle, x, thereby straightening and flattening out the supplemental resilient elements $4^c$, and simultaneously imposing an increased flexure and strain on the auxiliary leaf spring $10^c$. When the body and axle members are separated beyond the normal load position (N—n) the conjoined suspension elements are moved toward the dotted line positions (R—r) shown in Fig. 9. In this rebound movement the supplemental leaf springs $4^c$ are subjected to an endwise stress which flattens and straightens them out; but the auxiliary spring $10^c$ is not, in this case, subjected to any increased flexure during the rebound movement. When the parts have reached the extreme position, R—r, the lever arm $2^c$ has been rocked through an angle, z, which is considerably larger than the angle, x, through which the same member is moved in the compression movement (N—C or n—c). But this larger arcuate rebound movement does not impose any reverse bending stress on the main spring, because the angular displacement of the lever carries the "one way" shackle connection 21 out of contact with the swinging lever member—as indicated by the dotted lines at the left of Fig. 9—and the outer end of the main spring is, therefore, left free to assume its original unloaded and unstrained contour.

The organization illustrated in Fig. 11 is quite analogous in structural form to the one last described. It also comprises a side-leaf main spring $1^s$ which is coupled at its outer eye end to the intermediate portion of a short lever element $2^d$, by means of the "one way" elbow-joint shackle $19^d$, $21^d$. The outer extremity of the lever $2^d$ is pivoted directly to the scroll arm extension $3^d$ of the body frame; and the inner end of the said lever is rigidly secured, as before, to the base of the supplemental leaf spring 4ᵈ. The inner eye end of this secondary suspension element is pivotally connected to the adjacent extremity of the link 5ᵈ, which is rockably mounted on the axle bracket 11ᵈ and is normally held in alignment with the pivoted support of the lever 2ᵈ by means of the auxiliary compression spring 10ᵈ that is interposed between a head 17ᵈ on the lever 5ᵈ and a seat 9ᵈ on the bracket 11ᵈ.

The operation of this embodiment of my invention will be readily understood without extended description. When it is acted upon by compression stresses the parts are moved from the full line position of Fig. 11 to the dotted line positions C—c of that figure, thereby rocking the lever member 2ᵈ through the angle, x, and the link 5ᵈ through the angle, w, and concurrently imposing an increased flexural strain on both the secondary suspension springs 4ᵈ and 10ᵈ. When it is subjected to a rebound or expansion stress the separation of the body and axle members imposes a direct longitudinal or endwise pull on the ends of the supplemental leaf spring 4ᵈ and flattens and straightens out this secondary suspension element to substantially the same form as it assumes under compression stress. In this last movement the lever member 2ᵈ is rocked in a counter-clockwise direction through the angle, z (when the parts move from positions N—n to R—r), while the outer end of the main spring 1ˢ is concurrently moving in the opposite direction. These reverse movements of the lever and main spring elements cause the elbow-shackle elements 19ᵈ—21ᵈ to assume the form shown in Fig. 12, and bring the upper links 19ᵈ of the said shackle into engagement with lugs 23 on the lever 2ᵈ. This engagement holds the lever elements 21ᵈ of the shackle connection against any further inward movement (in the direction of the arrow of Fig. 12) and the end of the main spring 1ˢ is then also subjected to an endwise or longitudinal pull of the same nature as that which is imposed on the supplemental spring 4ᵈ. In this case, therefore, any extreme or excessive rebound of the system is elastically resisted and checked, not only by the action of the secondary resilient elements, under longitudinal stress, but also by the resistance of the primary suspension member to endwise stretching.

In both of the constructions last described the longitudinal tensions which are imposed on the spring elements during rebound movements are transmitted to the axle support, A, of the main spring. If these axle supports are connected to the body of the vehicle by radius rods 24 (as indicated by dotted lines in Fig. 13) the longitudinal stresses and strains last mentioned will be received and transmitted back to the body frame by the said radius rods. But these radius rods are frequently omitted, and the inner portions of the main side leaf springs are relied upon to keep the axle members in proper position with respect to the body frame. In such cases these inner portions of the main side leaf springs 1ˢ must also be relied upon to resist the longitudinal stresses transmitted to the axle, A, by the action, under rebound, of my improved secondary suspension combination.

The construction shown in Figs. 14 and 15 is adapted to be inserted between the end of the main spring, and the body arm 3ᵉ to which this end is ordinarily coupled by rigid shackle links. In this exemplification of my invention the lever and supplemental leaf spring elements (2ᶜ—4ᶜ, or 2ᵈ—4ᵈ) of Figs. 9, 10 and 11 are omitted; and the link connection 5ᵉ is pivotally attached, at its opposite ends, to a bracket frame 11ᵉ, (which is bolted directly to the body member 3ᵉ) and to the adjacent extremity of the primary suspension element 1ˢ. A pair of supplemental coil springs 10ᵉ—10ᵉ are inserted between a seat 9ᵉ, on the bracket frame 11ᵉ, and a head 25 which is clipped to the main spring and is held in fixed relation thereon (against the inward thrust of the springs 10ᵉ), by the flat spacing link 26 that is hooked over the eye end of the said spring. The initial tension of the secondary springs 10ᵉ is so adjusted that when the system is subjected to normal load the link 5ᵉ will be held in substantial alignment with the point at which the cooperating half of the primary suspension spring is engaged by the axle support A; and under such conditions the connecting element will serve only as a radius guide for the outer eye end of the member 1ˢ and the parts 25—26 attached thereto. But when the axle and the main spring are forced toward the body members, by a kinetic increase in load or by a compressive shock, the link 5ᵉ will be rocked in a counter-clockwise direction on its pivot support 11ᵉ (toward the dotted line position C—w of Figs. 13 and 14); and the length of the swinging member is such that the arc described by its moving end coincides with the natural path of movement of the adjacent extremity of the main spring as the latter rocks upwardly on the fixed pivot support, 17, (Fig. 13) and flattens out under the effect of compression. This movement is resisted by the increased flexure of the supplemental springs 10ᵉ—10ᵉ, which thus cooperate with the main spring in cushioning and abating minor oscillations of the elastically connected chassis members. If the load stress is sufficient to carry the link 5ᵉ to an upright position, the further compression of the secondary springs 10ᵉ is almost completely arrested; and the continued approach of the axle and body members is thereafter mainly resisted by the bending of the primary spring 1ˢ.

When the parts of the last described construction are in the position of static equilibrium the opposite extremities of the main spring are held at a fixed distance apart by means of the pin connection 17 and the link 5ᵉ. Any tendency of the body and axle members to rebound or separate from each other is normally accompanied by an increased bowing or "camber" of the primary suspension element, with a resultant shortening of the chordal distance between its extremities. But with such a construction as is now under consideration, any such shortening is prevented by the pull of the link 5ᵉ; and the rebound movement is therefore resisted and quickly checked by the elastic resistance of the main leaf spring to longitudinal or endwise strain. This functional action is substantially the same as that which characterizes the performance of the supplemental springs (4 to 4ᵈ) that form a part of the previously considered exemplifications of my improvements.

The construction illustrated in Fig. 16 differs from that shown in Figs. 14 and 15 in certain structural details. For example: The supplemental spring 10ᶠ is made in the form of a single multiple leaf spring, which is bolted at its base to the bracket member 11ᶠ, and is pivotally secured, at its eye end to a main spring clip 25ᶠ. The bracket 11ᶠ is forked at its outer extremity and the link 5ᶠ is pivoted between these forks. The functional action of the combination is precisely the same as that of the construction last considered, and does not, therefore, require any further explanation.

Fig. 17 illustrates another construction with differs only in details from the constructions shown in Figs. 14 and 16. In this last exemplification of my improvements the link element 5ᵍ is L-shaped in form, and the longer curved leg of this link is connected to one end of a spiral coil spring 10ᵍ; the other extremity of which is flexibly attached to the outer end of the body bracket 11ᵍ. When the parts are in the normal load position, shown in full lines in Fig. 17, the link 5ᵍ is held in the desired alignment with the main suspension member by the initial tension of the closed coil spring 10ᵍ; and when the system is subjected to compressive stresses the resultant counter-clockwise movement of the said link moves the parts toward the dotted line position (C—c) of Fig. 17, and thereby imposes an added tension on the supplemental spring. The rebound action is resisted in the manner already described in connection with the two preceding figures.

In those embodiments of my invention which are depicted in Figs. 9 to 17 inclusive, the elastic forces which are brought into play to restrain the rebound or expansion of the suspension system are obliquely inclined to the connected body and axle members; and act to prevent, or strongly restrain, any relative longitudinal displacement of these members as they oscillate or move up and down. In these exemplifications of my improvements this lateral restraint is effective only in resisting and abating endwise pitching of the tonneau on its running gear supports; and is not, in any way, effective in preventing the side rolling or side sway of the body members. But in all of the embodiments herein described there is a restraint against any lateral or horizontal displacement of the spring supported members in the plane of the suspension system; whether this plane be transversely disposed to the vehicle body (as it is in the case of cross-leaf spring suspensions) or be longitudinally disposed thereto—as it is when side-leaf spring supports are employed.

With the foregoing disclosure as a guide, engineers or others skilled in this art will be enabled to design many other forms of construction which embody, in whole or in part, the essential features of the present invention; and it is understood that the various exemplifications of my improvements which have been heretofore described are intended to be illustrative only, and are not intended to specifically limit what I hereinafter claim; to wit:

1. In an elastic suspension of two relatively movable members, the combination of a spring connected to one of said members, a freely swinging link flexibly attached, at opposite extremities, to the said spring and to the other member, and a second spring acting upon the said link to normally hold it in substantial axial alignment with the point of connection between the first spring and the first mentioned member.

2. In an elastic suspension system for vehicles the combination of a leaf spring attached to one of the vertically movable members of the chassis frame, a freely swinging link conjoining one extremity of said leaf spring with another vertically movable chassis member, and a second spring operatively connected to the said link and acting to maintain the latter in substantial axial alignment with the point of attachment of the first spring to the first mentioned member when the parts are in normal load position.

3. A spring suspension system for vehicles comprising in combination a bowed leaf spring operatively engaged by one of the relatively movable members of the vehicle, a freely swinging link connecting the said spring to another of the said relatively movable members, and means for maintaining said link in substantial axial alignment with the point of engagement between the said spring and the first mentioned member when the parts of the system are in normal load position.

4. A shock absorber system for vehicles which comprises the combination of a freely swinging link and two springs flexibly attached thereto, the first of the said springs being operatively engaged by one of the relatively movable body and axle members, and the second of said springs being carried by the other of said members and acting to maintain said link in substantial axial alignment with the point of engagement between the first spring and the first mentioned member.

5. In an elastic suspension system for two relatively movable members the combination of a main spring, a lever pivotally supported on one of the said members and flexibly connected to the end of the said main spring, a secondary spring in operative engagement with the said lever, a freely swinging link flexibly coupled to the said secondary spring, and elastic means for normally maintaining said link in substantial axial alignment with the pivot support of the said lever.

6. An elastic suspension system comprising the combination of a main leaf spring secured to one of the relatively movable members of a vehicle, a secondary spring flexibly supported on another of these members, means for operatively conjoining said secondary spring to said main spring, a swinging link flexibly connected to said secondary spring and to the same vehicle member to which said main spring is secured, and another spring acting upon said link to normally hold it in substantial axial alignment with the flexible support for said secondary spring.

In testimony whereof I have hereunto set my hand.

FRANK L. O. WADSWORTH.